(12) United States Patent
Rantaeskola et al.

(10) Patent No.: US 9,793,987 B2
(45) Date of Patent: Oct. 17, 2017

(54) METHOD AND APPARATUS FOR RECOGNIZING A DEVICE

(71) Applicant: Nokia Technologies Oy, Espoo (FI)

(72) Inventors: Antti Veli Rantaeskola, Tampere (FI); Jukka Pekka Reunamäki, Tampere (FI); Arto Tapio Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 14/790,381

(22) Filed: Jul. 2, 2015

(65) Prior Publication Data

US 2017/0004381 A1   Jan. 5, 2017

(51) Int. Cl.
*H04B 10/00* (2013.01)
*H04B 10/11* (2013.01)
*H04W 4/00* (2009.01)

(52) U.S. Cl.
CPC ............ *H04B 10/11* (2013.01); *H04W 4/005* (2013.01)

(58) Field of Classification Search
CPC ....... H04B 10/11; H04B 10/112; H04W 4/005
See application file for complete search history.

(56) References Cited

U.S. PATENT DOCUMENTS

| | | | | |
|---|---|---|---|---|
| 2014/0286644 A1* | 9/2014 | Oshima | ................. | H04B 10/11 398/118 |
| 2014/0290138 A1* | 10/2014 | Oshima | ................. | H04B 10/11 49/25 |
| 2016/0099774 A1* | 4/2016 | Sim | ..................... | H04B 10/116 398/115 |
| 2016/0104258 A1* | 4/2016 | Blatt | ..................... | G06F 21/10 705/310 |
| 2016/0191155 A1* | 6/2016 | Oshima | ................. | H04B 10/11 398/118 |
| 2016/0203369 A1* | 7/2016 | Inutsuka | ........... | G06K 9/00476 382/113 |
| 2016/0308865 A1* | 10/2016 | Poli | ..................... | H04L 63/0876 |
| 2016/0328452 A1* | 11/2016 | Nguyen | ................ | G06Q 10/10 |
| 2016/0334772 A1* | 11/2016 | Nguyen | ............. | G06F 19/3481 |
| 2017/0013588 A1* | 1/2017 | Prechner | .............. | H04W 24/10 |
| 2017/0061953 A1* | 3/2017 | An | ..................... | G10K 11/1786 |
| 2017/0094706 A1* | 3/2017 | Kim | .................... | H04W 76/023 |

OTHER PUBLICATIONS

"Advertising and Scan Response Data Format", Bluetooth Specification Version 4.0, vol. 3, Jun. 30, 2010, 568 pages.

(Continued)

*Primary Examiner* — Tesfaldet Bocure
(74) *Attorney, Agent, or Firm* — Locke Lord LLP (57) ABSTRACT

An apparatus, and computer program can recognize an IoT device. The apparatus, for example, may comprise at least one processor, and at least one memory including computer program code, the at least one memory and the computer program code configured to, with the at least one processor, cause the apparatus to receive an indication of an identifier of another apparatus via wireless communication, retrieve an emission pattern, and display a representation of the emission pattern according to a time-synchronization signal, wherein the retrieved emission pattern and the received indication are associated with each other. Similar and related example apparatus and example computer programs are also provided.

20 Claims, 6 Drawing Sheets

(56) References Cited

OTHER PUBLICATIONS

"Link Layer Specification", Core System Package [Low Energy Controller volume], Part B, Bluetooth Specification Version 4.1, vol. 6, Dec. 3, 2013, 79 pages.
"Generic Access Profile", Core System Package [Host volume], Part C, Bluetooth Specification Version 4.1, vol. 3, Dec. 3, 2013, 137 pages.

* cited by examiner

METHOD AND APPARATUS FOR RECOGNIZING A DEVICE

TECHNICAL FIELD

The present application relates generally to mechanisms that support wireless communications creation, and, more particularly, relate to a method and apparatus for recognizing a device.

BACKGROUND

Modern society has adopted, and is becoming reliant upon, electronic devices for various purposes. Electronic devices can vary from battery powered handheld devices to stationary household and/or commercial devices utilizing an electrical network as a power source. An electronic device typically has a user interface that allows a user to interact with the electronic device in various ways, such as, for example to configure and/or control operation of the electronic device according to the user's liking and/or preferences.

Wireless interfaces provide transfer of information over a distance without the use of electrical conductors such as wires. The distances involved may range from a very short (in the range of centimeters or the like) to long (in the range of tens or hundreds of kilometers or even more). Electronic devices equipped with one or more wireless interface can interact with each other over a suitable communications protocol using the wireless interface. Alternatively, or in addition, electronic devices may be equipped with wired interface to interact with each other using wires.

The Internet of Things (IoT) is the network of physical objects or "things" embedded with electronics, software, sensors and connectivity to enable it to achieve greater value and service by exchanging data with the manufacturer, operator and/or other connected devices, such as handheld devices. Each thing is uniquely identifiable through its embedded computing system but is able to interoperate within the existing Internet infrastructure.

Typically, IoT is expected to offer advanced connectivity of devices, systems, and services that goes beyond machine-to-machine communications (M2M) and covers a variety of protocols, domains, and applications. The interconnection of these embedded devices including smart objects, is expected to usher in automation in nearly all fields, while also enabling advanced applications like a smart grid.

Things, in the IoT, can refer to a wide variety of devices. These devices collect useful data with the help of various existing technologies and then autonomously flow the data between other devices. With wireless connectivity, various IoT devices may be controlled and/or monitored wirelessly.

SUMMARY

Various aspects of examples of the invention are set out in the claims.

According to a first aspect of the present invention, provide an apparatus, comprising: at least one processor; and at least one memory including computer program code; the at least one memory and the computer program code configured to, with the at least one processor, cause the apparatus to perform at least the following: generating an emission pattern; transmitting an indication of an identifier of the apparatus via wireless communication; wherein the emission pattern and the transmitted indication are associated with each other.

According to a second aspect of the present invention, provide an apparatus, comprising: at least one processor; and at least one memory including computer program code; the at least one memory and the computer program code configured to, with the at least one processor, cause the apparatus to perform at least the following: receiving an indication of an identifier of another apparatus via wireless communication; retrieving an emission pattern; and displaying a representation of the emission pattern according to a time-synchronization signal, wherein the retrieved emission pattern and the received indication are associated with each other.

According to a third aspect of the present invention, provide a computer readable medium tangibly encoded with a computer program executable by a processor to perform actions comprising: receiving an indication of an identifier of another apparatus via wireless communication; retrieving an emission pattern associated with the identifier of the another apparatus; and displaying a representation of the emission pattern according to a time-synchronization signal.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIG. 1 through FIG. 8 of the drawings.

An example technology Bluetooth Low Energy (BLE) that may be used as one of wireless communication technologies in this invention is firstly introduced. But the embodiments of the invention are not limited to BLE technology, but have applicability to any type of wireless communication technologies. Possible example technologies may comprise Bluetooth Low Energy (BLE), Bluetooth Basic Rate/Enhanced Data Rate, IEEE 802.11, cellular radio, Wi-Fi, RFID or any proprietary or standardized transceiver, and/or the like.

Figure 1:
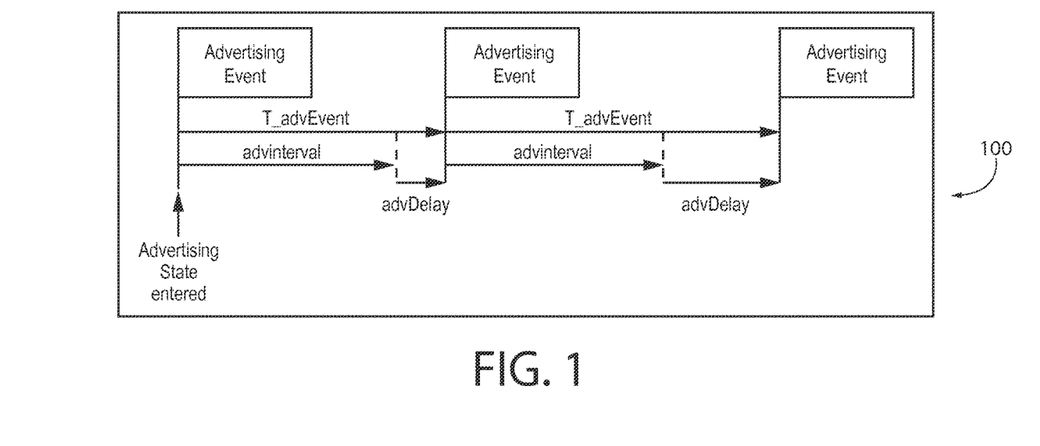
FIG. 1 illustrates an example block diagram for advertising events according to various example embodiments of the invention.

FIGS. 1-4 describe an example technology Bluetooth Low Energy (BLE). FIG. 1 is cited from FIG. 4.1 of "Specification of the Bluetooth System", Specification Volume 6, "Core System Package [Low Energy Controller volume]", Part B, LINK LAYER SPECIFICATION, Covered Core Package version 4.1, Publication date 3 Dec. 2013. FIG. 1 depicts advertising events 100 according to various example embodiments of the invention. BLE devices may advertise services and other information in advertising packets, which can be received by scanners. In addition to discover advertising information, advertising packets are also used in the connection setup. The Link Layer may enter the Advertising State when directed by the Host. When placed in the Advertising State, the Link Layer may send advertising packet data units (PDUs) in advertising events. Each advertising event may be composed of one or more advertising PDUs sent on used advertising channel indices. The advertising event may be closed after one advertising PDU has been sent on each of the used advertising channel indices or the advertiser may close an advertising event earlier to accommodate other functionality.

An advertising event can be one of the following types, a connectable undirected event, a connectable directed event, a non-connectable undirected event, and a scannable undirected event. For undirected advertising events or connectable directed advertising events used in a low duty cycle mode, the time between the start of two consecutive advertising events (T_advEvent) is computed as follows for each advertising event:

$$T\_advEvent = advInterval + advDelay$$

The advInterval may be an integer multiple of about 0.625 milliseconds (ms) in the range of about 20 milliseconds to about 10.24 seconds. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event.

Figure 2:
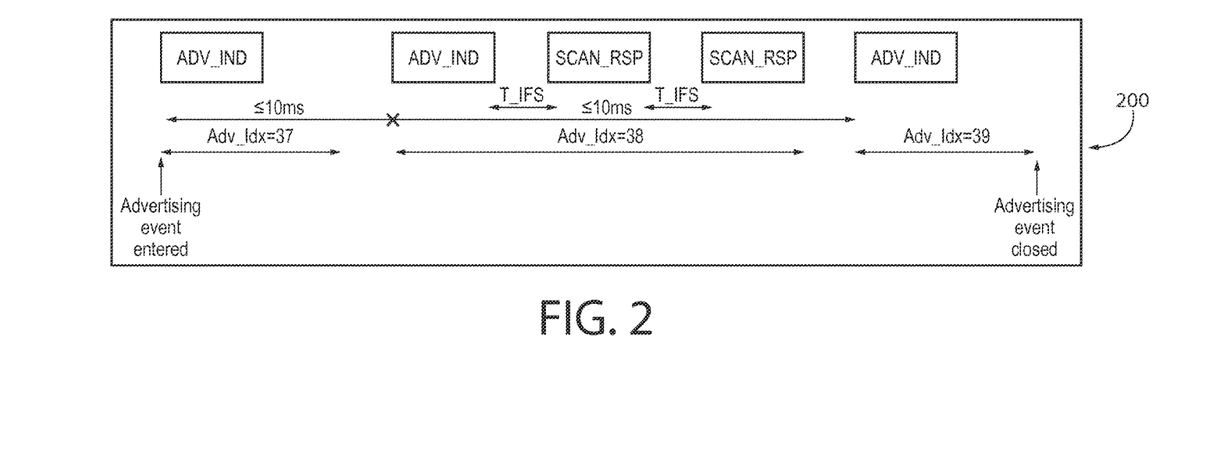
FIG. 2 illustrates an example block diagram for scan request and response by a Bluetooth Low Energy (LE) device according to various example embodiments of the invention.

FIG. 2 is cited from FIG. 4.3 of "Specification of the Bluetooth System", Specification Volume 6, "Core System Package [Low Energy Controller volume]", Part B, LINK LAYER SPECIFICATION, Covered Core Package version 4.1, Publication date 3 Dec. 2013. FIG. 2 depicts scan request and response by a Bluetooth Low Energy (BLE) device 200 according to various example embodiments of the invention. If advertiser receives a SCAN_REQ PDU that contains its device address from a scanner allowed by the advertising filter policy, it shall reply with a SCAN_RSP PDU on the same advertising channel index. After the SCAN_RSP PDU is sent, or if advertising filter policy prohibited processing the SCAN_REQ PDU, the advertiser shall either move to the next used advertising channel index to send another ADV_IND PDU, or close the advertising event.

Figure 3A:
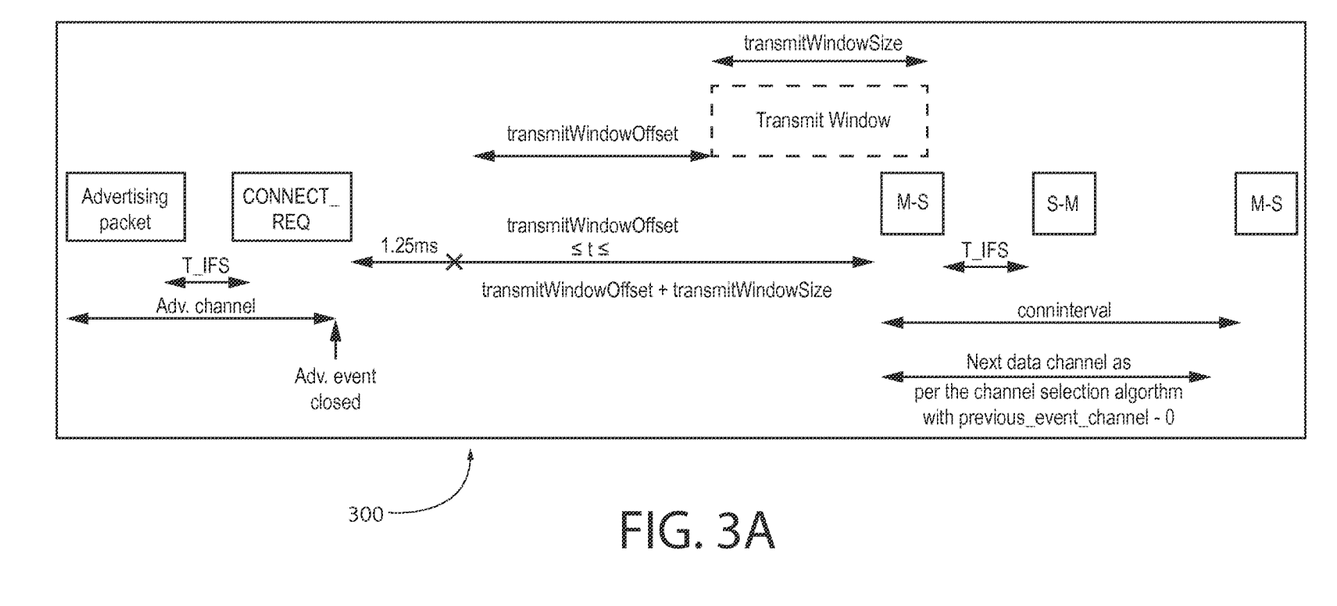
FIG. 3 illustrates an example block diagram for connection setup by a Bluetooth Low Energy (LE) device with a non-zero transmit window offset (transmitWindowOffset) according to various example embodiments of the invention.
Figure 3B:
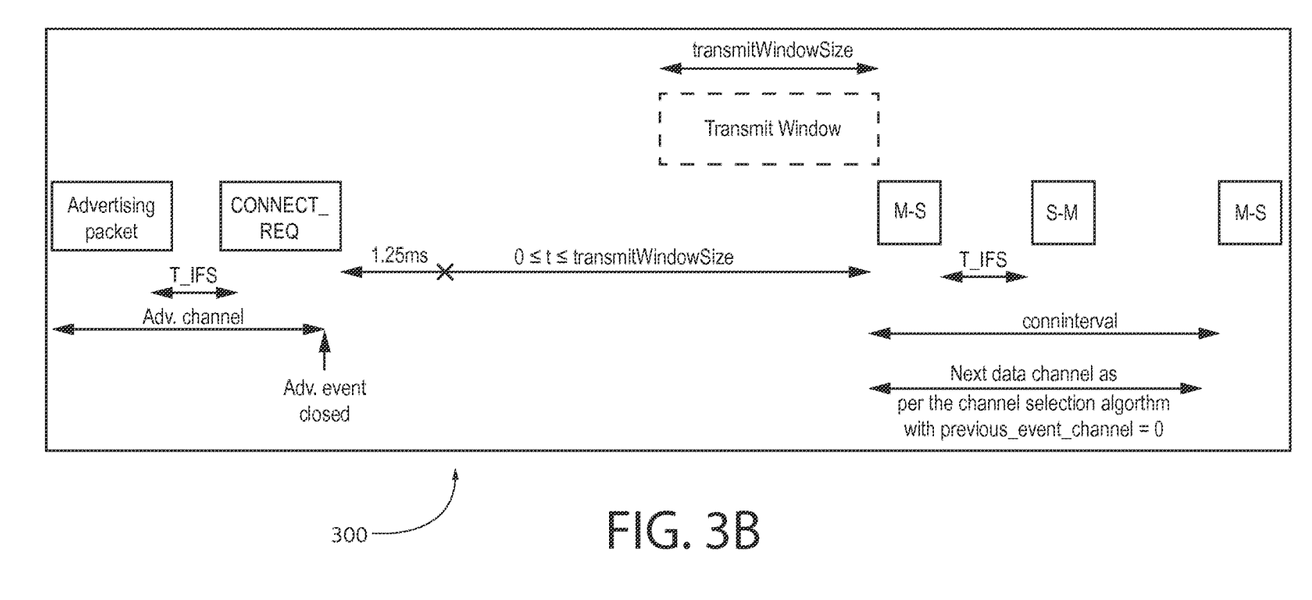
FIG. 3B illustrates an example block diagram for connection setup by a Bluetooth Low Energy (LE) device with a zero transmit window offset (transmitWindowOffset) according to various example embodiments of the invention.

FIG. 3A and FIG. 3B are cited separately from FIG. 4.13 and FIG. 4.14 of "Specification of the Bluetooth System", Specification Volume 6, "Core System Package [Low Energy Controller volume]", Part B, LINK LAYER SPECIFICATION, Covered Core Package version 4.1, Publication date 3 Dec. 2013. FIG. 3A depicts connection setup by a Bluetooth Low Energy (BLE) device 300 with a non-zero transmit window offset (transmitWindowOffset) according to various example embodiments of the invention. FIG. 3B depicts connection setup by a Bluetooth Low Energy (LE) device 300 with a zero transmit window offset (transmitWindowOffset) according to various example embodiments of the invention. Both FIG. 3A and FIG. 3B depict that if an advertiser receives a CONNECT_REQ PDU that contains its device address, from an initiator allowed by advertising filter policy, Link Layer shall exit Advertising State and transition to Connection State in Slave Role. If advertising filter policy prohibited processing the received CONNECT_REQ PDU, the advertiser shall either move to the next used advertising channel index to send another ADV_IND PDU, or close the advertising event.

Figure 4:
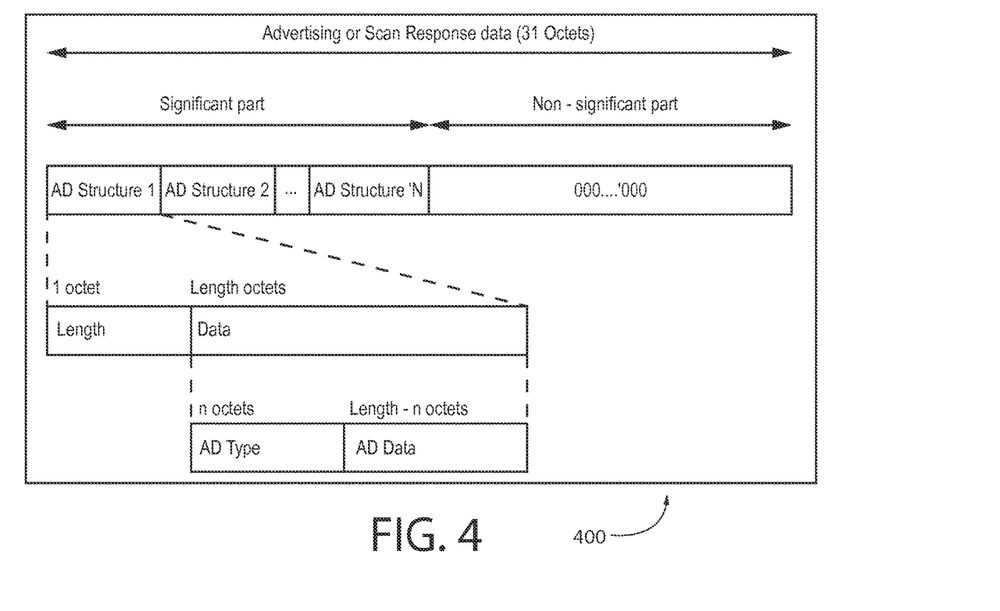
FIG. 4 illustrates an example block diagram for advertisement and scan response format of a Bluetooth Low Energy (LE) device according to various example embodiments of the invention.

FIG. 4 is cited from FIG. 11.1 of "Specification of the Bluetooth System", Specification Volume 3, "Core System Package [Host volume]", Part C, GENERIC ACCESS PROFILE, Covered Core Package version 4.1, Publication date 3 Dec. 2013. FIG. 4 depicts advertisement and scan response format of a Bluetooth Low Energy (BLE) device 400 according to various example embodiments of the invention. Advertising data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length-1 octet in the Data field depends on the value of the AD type field and is called the AD data. The non-significant part extends the Advertising and Scan Response data to 31 octets and shall contain all-zero octets. Only the significant part of the Advertising or Scan Response data needs to be sent over the air. The Advertising and Scan Response data is sent in advertising events. The Advertising Data is placed in the AdvData field of ADV_IND, ADV_NONCONN_IND, and ADV_SCAN_IND packets. The Scan Response data is sent in the ScanRspData field of SCAN_RSP packets.

IoT devices can communicated with handheld devices in an IoT network via wireless communication technologies. The above described technology Bluetooth Low Energy (BLE) is one of wireless communication technologies that can be used for communications between IoT devices and handheld devices. Wireless approach provided by connectivity solution fits greatly the places where IoT devices, such as valves or like, are located on odd places, like close to the roof of the industry building. But the problem is that when there are a plurality of similar IoT devices close to each other, there are no good means for the handyman to known which of the devices is which, especially it stands on the floor of the factory building. For example, during maintenance of certain valves that could be located side by side it is difficult to identify a particular device or valve, which may be identical, located in the close proximity of each other's using wireless technology. Only difference between devices may be MAC address of device, which in some cases may change randomly. It becomes almost impossible to make difference between devices unless there are some identification on the device, example ID number which can be hard to access or small that matching them is difficult in certain situations.

RSSI may not be suitable to identify the device either, because it is not very reliable in all cases, although there are use cases where it can be used for device selection, but it requires that the devices are not located in close proximity and the discovering device can be placed into very close proximity of the discovered device. However, if the device are in close proximity or the discovery is performed from distance, the RSSI is not very reliable.

Current solutions are using written identifier, for example MAC address or ID, such as name of the device, for example, "sensor 435", which may be written on side of the device or should be known by the user. Some solutions use sound, but it's not possible to use when devices are in close proximity or in loud environment.

This invention provides various solutions to solve various problems, such as the example identified problem. An apparatus, method, and software for recognizing an IoT device are disclosed. Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The terms "data", "information" and similar terms may be used interchangeably, according to some example embodiments of the present invention, to refer to data capable of being transmitted, received, operated on, and/or stored. The terms "apparatus", "device" and similar terms may also be used interchangeably, according to some example embodiments of the present invention. The invention is not limited to communications between IoT devices and handheld devices, but other devices that may aim for recognizing via wireless communications.

The invention proposes to add at least one of a visual element and an audio element to an IoT device, where the visual or audio element can display a representation of the visual or audio emission pattern. The IoT device may generate an audio or visual emission pattern and inform the handheld device which audio or visual emission pattern is selected via wireless communication technologies. The IoT device may also transmits an indication of an identifier of the IoT device via wireless communication, and the emission pattern and the transmitted indication are associated with each other so that the handheld device can receive the identifier of the IoT device. The emission pattern may change randomly with random intervals. When handheld device is in range of the IoT device, the emission pattern sequence between the IoT device and the handheld device can be easily compared. For example of visual emission pattern, the color of the IoT device and the color in handheld device list in control application can be compared. In order for easier matching, main colors may be used. Randomness will make devices easy the match in under 10 seconds.

According to various example embodiments, emission pattern may comprise at least one of audio emission pattern and visual emission pattern. In an example embodiment, for visual emission pattern, since most current devices only have a single monochrome LED, instead of an RGB pattern, an on-off pattern on a monochrome LED may be also used alternatively. RGB pattern may be used for RGB LED, but it is not limited to RGB, and may be used for example RGBA or RGBW too. If RGB LED is not available or there's concern of color blind people, the RGB LED can be replaced with few standard LEDs and then the pattern of the LEDs needs to be matched to same as in application.

According to various example embodiments, wireless communication technologies used for communications between an IoT device and a handheld device may comprise at least one of Bluetooth, cellular radio, Wi-Fi, RFID or any proprietary or standardized transceiver or transmission in the IOT device and the same transceiver or receiver in the handheld device. Although Bluetooth is mostly talked about in this invention, it is just used as an example embodiment.

According to various example embodiments of generating emission pattern by an IoT device, generating the emission pattern may comprise a random selection of the emission pattern by the IoT device. The IoT device may then have to transmit an indication of the generated emission pattern in an advertising data via wireless communication to the handheld device, so that the handheld device may know what to display on its screen.

In another example embodiment, generating the emission pattern may comprise a pseudo-random selection of the emission pattern based on the identifier of the IoT device, so that only the identifier of the IoT device needs to be transmitted. The handheld device can then use the same pseudo-random algorithm to derive the emission pattern itself.

In another example embodiment, generating the emission pattern may comprise a fixed selection of the emission pattern associated with the IoT device that is stored in the IoT device and a database accessible to the handheld device. In this case, only the identifier of the IoT device needs to be transmitted. The handheld device can then determine the emission pattern by accessing the database where the association between the emission pattern and the identifier of the IoT device is stored.

In another example embodiment, the emission pattern may be included in a scan request sent from the handheld device to the IoT device, so that the handheld device may dictate what the IoT device will show. The IoT device may just use the emission pattern suggested by the handheld device.

According to various example embodiments, a handheld device may further transmit a scan request message to trigger a usage of an emission pattern. The scan request message is a response to advertisement packet sent during advertisement event and may comprise an address of the handheld device. Instead of as a result of a scan request from outside, a usage of the emission pattern may be alternatively triggered as a result of an internal maintenance trigger, for example, an internal fault-detection circuit in the IOT device. An error light is then displayed.

According to various example embodiments, handheld device further compare the emission pattern sequence between the IoT device and the handheld device by using a camera or other light sensor in the handheld device. The handheld device attempts to match the retrieved visual emission pattern against at least one signal obtained by a light sensor and indicating whether a match has been successfully established. The indication can be audible and/or visible. The match can be determined to be successful if a correlation between the retrieved visual emission pattern and the at least one signal obtained by the light sensor exceeds a threshold. The at least one signal can be at least one static image or a video sequence. An operator can move the handheld's camera subsequently in the general direction of IoT devices in the immediate surrounding until the handheld indicates a successful match.

According to various example embodiments, the visual emission pattern may comprise a plurality of color codes. According to one example, an IoT device may randomize 3 bits which correspond to red, green and blue colors of the RGB LED. This color is also added to the Bluetooth Low Energy advertise packet. Handheld device reads these packets and updates the list of devices and color marker next to the name of the device every time it receives advertise packet from the device.

According to various example embodiments, IoT device may also randomize delay timer to be about of 2-5 seconds. When timeout runs out, new RGB value is randomized and updated, and new timeout is also randomized. This makes the changes to the color to happen different times between devices, which also makes the recognition easier for the user. Matching the color and change phase makes it relatively simple procedure for the user.

Figure 5:
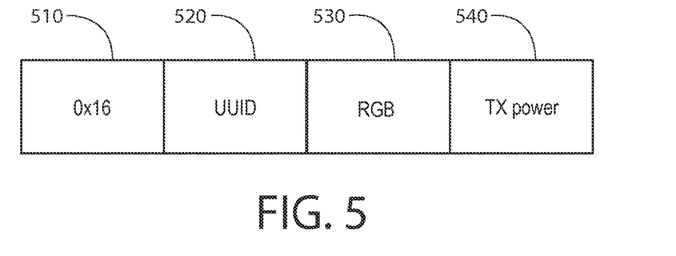
FIG. 5 illustrates an example block diagram for advertising data format according to various example embodiments of the present invention.

FIG. 5 illustrates an example block diagram for implementations of data field format of the advertising data structure according to various example embodiments of the present invention. FIG. 5 depicts on the basis of structure of Bluetooth Low Energy (BLE) as an example technology. In an example embodiment, advertising data may comprise at least Advertising (AD) type field 510, Universally Unique Identifier (UUID) field 520, and service field. The service field of advertising data may comprise RGB field 530 and optionally Tx power field 540, and the service can be defined by UUID. In an example embodiment, the values of AD type and UUID may be set as:

AD type (<<Service Data-16 bit UUID>>)=0x16
UUID=0xFFFF (example)

The values of AD type and UUID shown above are just examples and can be different than those. In the example, the service field has two parts: RGB and optional Tx power. The observer which receives the data can therefore identify RGB data currently used in the device and may use optional Tx power for better listing of the devices. For example, closest devices for example on the top of the list. Thus it easier for the user to select correct device. The advertising data may also include for example IP address and the device may not be connectable by the technology used to deliver RGB information, but the technology is used to get access information.

The device may always show LEDs or it may do it for example based on at least one of the following actions:

For some time after receiving scan request, this may include also some RSSI threshold;
When requested by the discovering device;
Between some predetermined time.

The RGB data can be changed to random value for example every 3 s or the interval can be also random. The discovering device may use image processing for selecting the device or it may be based on user actions.

Figure 6:
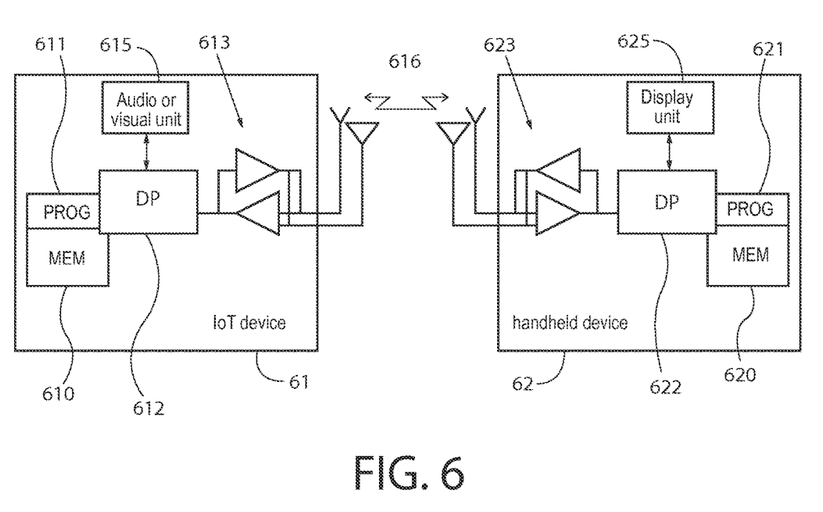
FIG. 6 illustrates a simplified block diagram of an apparatus for recognizing an IoT device according to various example embodiments of the present invention.

FIG. 6 depicts a simplified block diagram of a wireless network for recognizing an IoT device according to various example embodiments of the present invention. An apparatus 61 is adapted for communication over a wireless link 616 with another apparatus 62. The apparatus 61 may be an IoT device, and the another apparatus 62 may be a handheld device. The wireless network may comprise at least one IoT device and at least one handheld device.

The apparatus 61 comprises at least one processor, such as a data processor (DP) or controller 612, at least one computer-readable storage medium embodied as at least one memory (MEM) 610 that stores a program of computer instructions or codes (PROG) 611, and a suitable radio frequency (RF) transceiver 613 for wireless communications with the another apparatus 62.

The another apparatus 62 also comprises at least a processor, such as data processor (DP) or controller 622, at least one computer-readable memory medium embodied as at least one memory (MEM) 620 that stores a program of computer instructions or codes (PROG) 621, and a suitable RF transceiver 623 for communication with the apparatus 61.

At least one of the PROGs 611 and 621 comprises program instructions that, when executed by the associated DP, enable the device to operate in accordance with the example embodiments of this invention, as will be discussed below in greater detail.

The example embodiments of this invention may be implemented at least in part by computer software executable by the DP 612 of the apparatus 61 and/or by the DP 622 of the another apparatus 62, or by hardware, or by a combination of software and hardware and firmware.

For the purposes of describing the example embodiments of this invention an IoT device 61 and a handheld device 62 may also comprise dedicated processors, for example emission pattern units in accordance with various exemplary embodiments in this invention. The emission pattern unit in the IoT device 61 may be constructed so as to generate an emission pattern, for example, at least one of a visual emission pattern and an audio emission pattern. The emission pattern unit in the handheld device 62 may be constructed so as to retrieve the emission pattern used by the IoT device 61. The IoT device 61 may further comprise at least one of a visual unit and an audio unit 615. The at least one of a visual unit and an audio unit 615 in the IoT device 61 may be constructed so as to represent visual or audio emission pattern that is provided by the emission pattern unit in accordance with various exemplary embodiments in accordance with this invention. The handheld device 62 may further comprise a display unit 625. The display unit 625 in the handheld device 62 may be constructed so as to display representation of the emission pattern according to a time-synchronization signal.

According to some example embodiments, the visual unit 615 in the IoT device 61 may comprise at least one of Red-Green-Blue (RGB) Light-Emitting Diode (LED), Red Green Blue Alpha (RGBA) LED, Red Green Blue White (RGBW) LED, and a single monochrome LED, but not limited to these types of LEDs. The added LED unit may changes its color randomly with random intervals. If RGB LED is not available or there's concern of color blind people, the RGB led can be replaced with few standard LEDs.

Figure 7:
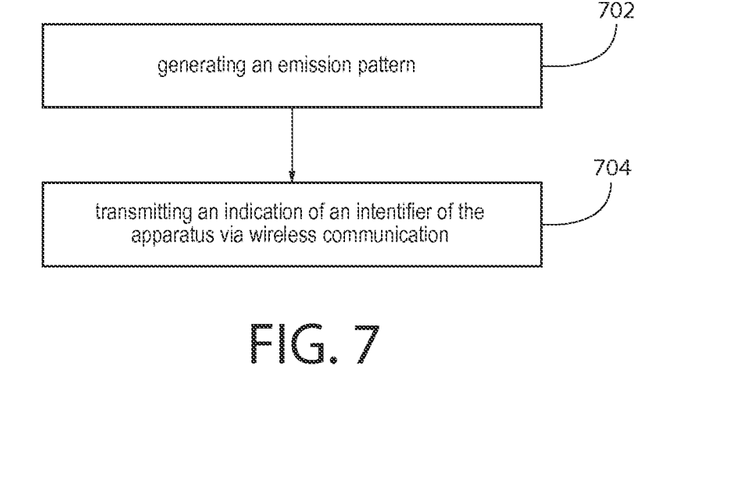
FIG. 7 illustrates an example flow diagram showing operations of an IoT device according to various example embodiments of the present invention.

FIG. 7 depicts an example flow diagram showing operations for an IoT device according to various example embodiments of the present invention. It illustrates the operation of a method, and actions performed by a processor at the IoT device as a result of executing a computer program stored on a computer readable memory, in accordance with the example embodiments of this invention.

At block 702, an IoT device generates an emission pattern.

In an example embodiment at block 702, the emission pattern comprises at least one of an audio emission and a visual emission, and wherein the visual emission comprises one of a pattern of Red-Green-Blue (RGB) Light-Emitting Diode (LED), a pattern of multiple monochrome Light-Emitting Diodes (LEDs), and an on-off pattern on a monochrome Light-Emitting Diodes (LEDs).

In an example embodiment at block 702, generating the emission pattern may comprise a random selection of the emission pattern by the IoT device, then transmit an indication of the generated emission pattern in an advertising data via wireless communication.

In an example embodiment at block 702, generating the emission pattern may comprise generating the emission pattern based on the identifier of the IoT device by using a pseudo-random algorithm.

In an example embodiment at block 702, generating the emission pattern may comprise associating the emission pattern with the identifier of the IoT device and storing the emission pattern associated with the identifier of the IoT device in an accessible database.

In an example embodiment at block 702, the emission pattern is dynamically changed every once in a while, and in response to that, the indication of the emission pattern is changed accordingly.

At block 704, the IoT device transmits an indication of an identifier of the IoT device via wireless communication. The emission pattern and the transmitted indication are associated with each other.

In an example embodiment at block 704, the operation may further comprise receiving a scan request message that contains an address of the handheld device, and generating the emission pattern associated with the identifier of the IoT device by using the emission pattern received in the scan request message.

In an example embodiment at block 704, the operation may further comprise triggering a usage of the emission pattern according to one of an internal maintenance trigger and a scan request message received from the handheld device.

In an example embodiment at block 704, the wireless communication may comprise at least one of Bluetooth, cellular, Wi-Fi, RFID, proprietary transceiver in the apparatus, standardized transceiver in the apparatus, proprietary transceiver in the another apparatus and standardized transceiver in the another apparatus.

Figure 8:
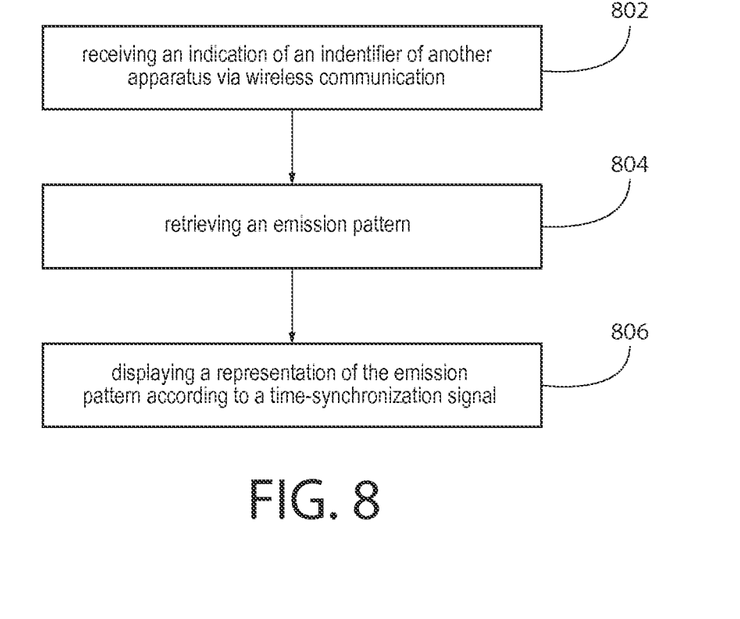
FIG. 8 illustrates an example flow diagram showing operations of a handheld device according to various example embodiments of the present invention.

FIG. 8 depicts an example flow diagram showing operations for a handheld device according to various example embodiments of the present invention. It illustrates the operation of a method, and actions performed by a processor at the handheld device as a result of executing a computer program stored on a computer readable memory, in accordance with the example embodiments of this invention.

At block 802, a handheld device receives an indication of an identifier of an IoT device via wireless communication in accordance with an example embodiment.

In an example embodiment at block 802, the wireless communication comprises at least one of Bluetooth, cellular, Wi-Fi, RFID, proprietary transceiver in the apparatus, standardized transceiver in the apparatus, proprietary transceiver in the another apparatus and standardized transceiver in the another apparatus. The indication of the identifier of the IoT device is used to identify the IoT device by the handheld device. In an example embodiment, the indication of the identifier of the IoT device comprises at least one of a BLE device address and an advertised identifier.

At block 804, the handheld device retrieves an emission pattern in accordance with an example embodiment.

In an example embodiment at block 804, the emission pattern may comprise at least one of an audio emission and a visual emission, and wherein the visual emission pattern may comprise one of a pattern of Red-Green-Blue (RGB) Light-Emitting Diode (LED), a pattern of multiple monochrome Light-Emitting Diodes (LEDs) and an on-off pattern on a monochrome Light-Emitting Diodes (LED).

In an example embodiment at block 804, retrieving the emission pattern may comprise receiving the emission pattern in an advertising data via wireless communication.

In an example embodiment at block 804, retrieving the emission pattern may comprise deriving the emission pattern by using a same pseudo-random algorithm based on the identifier of the IoT device as that is used by the IoT device;

In an example embodiment at block 804, retrieving the emission pattern may comprise obtaining the emission pattern from an accessible database based on the identifier of the IoT device.

In an example embodiment at block 804, retrieving the emission pattern may comprise transmit a scan request message that contains address of the IoT device, and the scan request message may comprise the emission pattern selected by the handheld device.

At block 806, the handheld device displays a representation of the emission pattern according to a time-synchronization signal in accordance with an example embodiment. The retrieved emission pattern and the received indication are associated with each other.

In an example embodiment at block 806, the operation may further comprise compare sequence between the handheld device and the IoT device by using a camera or other light sensor in the handheld device.

According to various example embodiments of the present invention, it provides a computer readable medium tangibly encoded with a computer program executable by a processor to perform actions comprising receiving an indication of an identifier of another apparatus via wireless communication, retrieving an emission pattern associated with the identifier of the another apparatus, and displaying a representation of the emission pattern according to a time-synchronization signal.

Without in any way limiting the scope, interpretation, or application of the claims appearing below, a technical effect of one or more of the example embodiments disclosed herein is to provide support of recognizing an IoT device. Another technical effect of one or more of the example embodiments disclosed herein is to make recognition easier and possible from distance. Another technical effect of one or more of the example embodiments disclosed herein is to make recognition faster in close proximity.

Embodiments of the present invention may be implemented in software, hardware, application logic or a combination of software, hardware and application logic. The software, application logic and/or hardware may reside on an apparatus, such as IoT device or handheld device, or reside on an apparatus in the IoT device or handheld device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code;
   the at least one memory and the computer program code configured to, with the at least one processor, cause the apparatus at least to:
   generate an emission pattern for emitting, by the apparatus, at least one of audio or light in accordance with the emission pattern; and
   transmit an indication of an identifier of the apparatus via radio frequency wireless communication,
   wherein the emission pattern and the transmitted indication are associated with each other, and
   wherein the emission pattern is generated based on the identifier of the apparatus by using a pseudo-random algorithm.

2. The apparatus according to claim 1, wherein the emission pattern comprises at least one of an audio emission or a visual emission, and wherein the visual emission comprises one of a pattern of Red-Green-Blue (RGB) Light-Emitting Diode (LED), a pattern of multiple monochrome Light-Emitting Diodes, or an on-off pattern on a monochrome Light-Emitting Diode.

3. The apparatus according to claim 1, wherein the apparatus is further caused to generate the emission pattern by associating the emission pattern with the identifier of the apparatus and to store the emission pattern associated with the identifier of the apparatus in an accessible database.

4. The apparatus according to claim 1, wherein the apparatus is further caused to receive a scan request message that contains an address of another apparatus.

5. The apparatus according to claim 4, wherein the apparatus is further caused to generate the emission pattern associated with the identifier of the apparatus by using an emission pattern received in the scan request message.

6. The apparatus according to claim 1, wherein the apparatus is further caused to trigger a usage of the emission pattern according to one of an internal maintenance trigger or a scan request message received from another apparatus.

7. The apparatus according to claim 1, wherein the emission pattern is dynamically changed every once in a while, and in response to dynamically changing the emission pattern, an indication of the emission pattern is also changed.

8. The apparatus according to claim 1, wherein the wireless communication comprises at least one of Bluetooth, cellular, Wi-Fi, RFID, proprietary transceiver in the apparatus, standardized transceiver in the apparatus, proprietary transceiver in another apparatus or standardized transceiver in the other apparatus.

9. A method, comprising:
   generating an emission pattern for emitting, by an apparatus, at least one of audio or light in accordance with the emission pattern; and
   transmitting an indication of an identifier of the apparatus via radio frequency wireless communication,
   wherein the emission pattern and the transmitted indication are associated with each other, and
   wherein the emission pattern is generated based on the identifier of the apparatus by using a pseudo-random algorithm.

10. The method according to claim 9, wherein the emission pattern comprises at least one of an audio emission or a visual emission, and wherein the visual emission comprises one of a pattern of Red-Green-Blue (RGB) Light-Emitting Diode (LED), a pattern of multiple monochrome Light-Emitting Diodes, or an on-off pattern on a monochrome Light-Emitting Diode.

11. The method according to claim 9, further comprising generating the emission pattern by associating the emission pattern with the identifier of the apparatus and storing the emission pattern associated with the identifier of the apparatus in an accessible database.

12. The method according to claim 9, further comprising receiving a scan request message that contains an address of another apparatus.

13. The method according to claim 12, further comprising generating the emission pattern associated with the identifier of the apparatus by using an emission pattern received in the scan request message.

14. The method according to claim 9, further comprising triggering a usage of the emission pattern according to one of an internal maintenance trigger or a scan request message received from another apparatus.

15. The method according to claim 9, wherein the emission pattern is dynamically changed every once in a while, and in response to dynamically changing the emission pattern, an indication of the emission pattern is also changed.

16. The method according to claim 9, wherein the wireless communication comprises at least one of Bluetooth, cellular, Wi-Fi, RFID, proprietary transceiver in the apparatus, standardized transceiver in the apparatus, proprietary transceiver in another apparatus or standardized transceiver in the other apparatus.

17. A non-transitory computer readable medium comprising computer processor-executable program code stored thereon, which when executed by a processor causes an apparatus at least to perform:
   generating an emission pattern for emitting, by an apparatus, at least one of audio or light in accordance with the emission pattern; and
   transmitting an indication of an identifier of the apparatus via radio frequency wireless communication,
   wherein the emission pattern and the transmitted indication are associated with each other, and
   wherein the emission pattern is generated based on the identifier of the apparatus by using a pseudo-random algorithm.

18. The non-transitory computer readable medium according to claim 17, wherein the emission pattern comprises at least one of an audio emission or a visual emission, and wherein the visual emission comprises one of a pattern of Red-Green-Blue (RGB) Light-Emitting Diode (LED), a pattern of multiple monochrome Light-Emitting Diodes, or an on-off pattern on a monochrome Light-Emitting Diode.

19. The non-transitory computer readable medium according to claim 17, wherein the computer processor-executable program code, when executed by the processor causes the apparatus at least to perform generating the emission pattern by associating the emission pattern with the identifier of the apparatus and storing the emission pattern associated with the identifier of the apparatus in an accessible database.

20. The non-transitory computer readable medium according to claim 17, wherein the computer processor-executable program code, when executed by the processor causes the apparatus at least to perform:
    receiving a scan request message that contains an address of another apparatus; and
    generating the emission pattern associated with the identifier of the apparatus by using an emission pattern received in the scan request message.

\* \* \* \* \*